2,746,993
Patented May 22, 1956

2,746,993
DEHYDROGENATION OF ALCOHOLS

Fred Dean, Norton-on-Tees, England, assignor to Imperial Chemical Industries Limited, a corporation of Great Britain No Drawing. Application November 24, 1950,
Serial No. 197,521

Claims priority, application Great Britain
December 16, 1949

4 Claims. (Cl. 260—598)

This invention relates to the production of aldehydes or ketones and has for its object to provide a process for producing aldehydes or ketones in high yield and high purity.

One well-known method of aldehyde production is the so-called Oxo reaction in which olefines are reacted with water gas to produce aldehydes containing one more carbon atom than the starting olefines. This method suffers from the disadvantage that upon distillation of product there is considerable loss of aldehyde by self-condensation and by condensation with the appreciable amount of alcohol formed simultaneously in the Oxo process, yielding acetals.

Aldehydes and ketones have also been prepared by dehydrogenation of alcohols in the vapour phase, but the known processes of this kind often suffer from the disadvantage that there is appreciable pyrolysis to gaseous hydrocarbons.

Dehydrogenation of alcohols which may be in the liquid phase has also been described, 5% reduced nickel having been used as a catalyst in one case, intimately mixed oxides of copper and chromium in another, and a catalyst comprising either zinc, copper or cadmium associated with chromium oxide in a third. In none of these cases was a yield and purity of the producd obtained comparable with that which is achieved by using the present invention.

According to the present invention, alcohols are dehydrogenated in a continuous process, which may be single stage, in which the alcohol is treated in the liquid phase at elevated temperatures and preferably atmospheric but, when necessary, reduced or increased pressure with a solid dehydrogenation catalyst, preferably of the copper barium chromite type, and in which the product of this treatment is passed through a fractionating column, unreacted alcohol and/or other material leaving the reactor in the form of vapour, together with the aldehyde or ketone being refluxed to the reaction zone, the final product being recovered by condensing the vapour leaving the top of the column.

The invention is applicable to primary and to secondary alcohols. It will be understood that, in the case of a primary alcohol, an aldehyde is obtained as a product, and, in the case of a secondary alcohol, a ketone.

The alcohol is fed continuously to a reactor containing a boiling mixture of the alcohol (and, if necessary, an entrainer) and catalyst. Hydrogen is evolved as a by-product. Thus, the formula of the reaction in the case of a primary alcohol is:

$$R \cdot CH_2OH \rightarrow R \cdot CHO + H_2$$

The formation of heavy ends by self-condensation of the product or by acetal formation is limited by removing the product from the reaction zone at a rate as nearly equal to the rate of formation as possible, i. e., by preventing as far as possible any build-up of product in the reaction zone. The reaction temperature, therefore, is, at least initially, of the order of the boiling point of the mixture of alcohol and catalyst (and entrainer, if any is used). The still system is designed with the calculated number of theoretical plates and reflux ratio to give both a high concentration of product in the take-off and a low concentration of product in reflux return to the reactor so as to minimise build-up of condensation products. It has, however, been found that a small amount of heavy ends does build up slowly in the boiler as is evidenced by a gradual rise in temperature. A periodic purge of reactor burden accompanied by the appropriate make-up of catalyst may therefore be desirable.

When applied to the dehydrogenation of primary alcohols, the process according to the invention is accompanied by the advantage that the aldehydes, which are known readily to oxidise in air to give the corresponding acids, are obtained in an atmosphere of hydrogen.

The invention is applicable in the first place to alcohols with boiling points from about 150° C. upwards, i. e., high enough to ensure a practicable rate of dehydrogenation to be obtained in the process. Being a liquid phase process, it is particularly applicable to branch chain alcohols (e. g., the so-called Oxo alcohols) which under the more drastic conditions of high temperature vapour phase dehydrogenation would be easily pyrolysed to undesirable hydrocarbons of low molecular weight.

If the process is applied to high boiling alcohols (i. e., to alcohols boiling above about 250° C.), the dehydrogenation temperature must be modified either by reducing the pressure to make the boiling point of the dehydrogenation product coincide with the reaction temperature required, or by the use of a low-boiling entrainer, preferably one which forms an azeotrope with the dehydrogenation product which on condensation separates into two layers, this azeotrope being returned continuously to the boiler. The reaction temperature so chosen must, on the one hand, be low enough to avoid undesirable side reactions such as decarbonylation that may occur at high temperatures and, on the other hand, high enough to ensure a useful rate of dehydrogenation.

The process of the present invention may be applied to low-boiling alcohols by the use of increased pressure; this application, however, although not outside the scope of this invention, is consdered less attractive. In this case, as well as in general, the tendency to rehydrogenation may be minimised, according to an additional feature of the invention, by separating hydrogen from the reaction zone at the bottom of the fractionating column by means of selective diffusion.

The invention has been found to be particularly useful as applied to the production of aldehydes from primary aliphatic alcohols boiling in the temperature range of approximately 150° to 250° C. As indicated, it may also be applied to higher and lower boiling alcohols and it may likewise be applied to aliphatic secondary alcohols and primary and secondary cyclic alcohols. Obviously, however, it cannot be applied to any case in which azeotropes are formed between the alcohol and the resultant aldehyde or ketone as in such a case the desired separation of the product from the reactants cannot be achieved.

Examples will now be given to demonstrate the possibilities of the invention.

EXAMPLE 1

For this example, relating to the preparation of 3,5,5-trimethyl-hexanal-1 from the corresponding nonanol, a column was specially designed by the McCabe-Thiele method to give a high aldehyde content in the product taken off and a low concentration of aldehyde in the reflux return to the reactor. It consisted of a 6′ x 1¼″ column, packed to a length of 4′6″ with ⅛″ rings of gauze made of the alloy known under the trade name "Staybrite," this column being mounted on a reactor/boiler of 3 litres capacity.

The catalyst used was a copper barium chromite catalyst prepared by the thermal decomposition of the precipitate obtained by adding ammonia to a solution containing copper-nitrate, barium nitrate and chromium trioxide in the atomic ratio Cu:Ba:Cr=90:10:100. It was used in a concentration of 5% by volume in the alcohol-catalyst mixture, the catalyst volume being arrived at by measuring the volume of the dry catalyst powder. Nonanol was put through the unit at the rate of 2 litres per hour per litre of dry catalyst powder. Product was taken off at 1.2 to 1.5 moles per hour, and the reflux ratio was about 5:1 with about 15% nonaldehyde in the reflux return to the boiler. This process was operated continuously for 300 hours at a reaction temperature ranging from 190° to 260° C. The product, analysing on an average as 95% by weight of nonaldehyde and 5% by weight of unreacted nonanol was obtained in an average yield of 96% by weight which represents 97.5% of the theoretical yield of aldehyde. The catalyst consumption was 1.9 kgs. per tonne of product. Hydrogen was evolved at a purity of at least 99% by volume. No purge of the reactor burden was found necessary over the stated period of 300 hours.

In arriving at the following examples, the columns used were not specially designed for the respective processes as would have to be done on the lines referred to above in order to obtain optimum yields of aldehyde or ketone, as the case may be. The examples nevertheless demonstrated that yields of the order obtained in Example 1 could in each case have been obtained with the use of a correctly designed fractionating unit.

EXAMPLE 2

This example refers to the dehydrogenation of isomeric nonanols, viz., 4,5,5-trimethylhexanol-1, 3,4,5-trimethylhexanol-1 and 3,4,4-trimethylhexanol-1. The distillation column in these experiments measured 18" x 1"; it was again packed with ⅛" rings of gauze made of the alloy known under the trade name "Staybrite." The reactor burden consisted of 70% by volume of the respective alcohol and 30% by volume (measured on the dry catalyst powder) of a copper barium chromite catalyst identical with that used in Example 1. The product was taken off at a reflux ratio of 20:1 which is higher than would be employed in order to obtain a high yield: this high ratio was chosen so as to obtain a high quality product by ensuring adequate fractionation even with a column which, as stated above, was not specially designed for the particular mixture with which it was to deal. The results are summarized in Table 1.

Table I

| Alcohol | B. Point = Initial Reaction Temperature | Period of Operation (hours) | Percent pass Conversion (Alcohol) | Yield of product in percent by weight | Weight percent of aldehyde in product |
|---|---|---|---|---|---|
| 4,5,5-trimethyl-hexanol-1 | 202.0° C. | 7.0 | 94 | 74 | 95 |
| 3,4,5-trimethyl-hexanol-1 | 205.5° C. | 3.0 | 80 | 64 | 95 |
| 3,4,4-trimethyl-hexanol-1 | 207.5° C. | 3.5 | 88 | 79 | 95 |

The exit gas analysed as at least 99% by volume of pure hydrogen.

The aldehydes obtained are believed to be novel compounds. Some of their properties are listed in Table II.

Table II

| Aldehyde | % C Theory | % C Found | % H Theory | % H Found | $n_D^{20}$ | $d_4^{20}$ | B. Pt. at 760 mms. Hg |
|---|---|---|---|---|---|---|---|
| 4,5,5-trimethyl-hexanal-1 | 76.1 | 76.3 | 12.6 | 12.3 | 1.4323 | 0.8385 | 179.5 |
| 3,4,5-trimethyl-hexanal-1 | 76.1 | 76.1 | 12.6 | 12.0 | 1.4326 | 0.8433 | 184.4 |
| 3,4,4-trimethyl-hexanal-1 | 76.1 | 75.5 | 12.6 | 11.7 | 1.4382 | 0.8495 | 182.1 |

The properties of the 2,4-dinitrophenyl hydrazones of these aldehydes are listed in Table III:

Table III

| Aldehyde | Melting Point °C. | Appearance | 2,4-Dinitrophenyl hydrazone % C Theory | % C Found | % H Theory | % H Found | % N Theory | % N Found |
|---|---|---|---|---|---|---|---|---|
| 4,5,5-trimethyl hexanal-1 | 134 | Yellow ex 75 percent Ethanol | 56.0 | 56.2 | 6.7 | 6.8 | 17.4 | 17.4 |
| 3,4,5-trimethyl hexanal-1 | 65 | Yellow ex 75 percent Ethanol | 56.0 | 56.3 | 6.7 | 6.7 | 17.4 | 17.5 |
| 3,4,4-trimethyl hexanal-1 | 94 | Yellow ex Absolute Alcohol | 56.0 | 56.4 | 6.7 | 6.7 | 17.4 | 17 |

EXAMPLE 3

The alcohols heptanol-1, octanol-1 and decanol-1 were all dehydrogenated in units similar to that described in connection with Example 2, using 5% by volume (measured on the dry catalyst powder) of copper barium chromite catalyst identical with that used in Example 1, at atmospheric pressure, and at least initially, at or near the boiling point of the alcohol in each case, i. e., 175° C. for the heptanol, 196° C. for the octanol and 231° C. for the decanol. An average pass conversion of 90% was observed. The corresponding aldehydes heptanal-1, octanal-1 and decanal-1, all of which find extensive application in the synthetic perfume industry, were obtained in about 70% average yield, and 95–100° purity.

EXAMPLE 4

The alicyclic primary alcohol cyclohexyl-carbinol was similarly dehydrogenated at an initial reactor temperature of about 185° C. which is the boiling point of the alcohol at atmospheric pressure. Using 5% by volume (as measured on the dry catalyst powder) of copper barium chromite catalyst identical with that used in Example 1, hexahydrobenzaldehyde was obtained in 95% purity and 65% by weight yield. The aldehyde was identified by the formation of its 2,4-dinitrophenyl hydrazone melting at 68° C.

EXAMPLE 5

A mixture of dimethylcyclohexanols was dehydrogenated at atmospheric pressure and 170° to 230° C. using 5% by volume (as measured on the dry catalyst powder) of the catalyst used in the preceding examples. 60% pass conversion of the alcohols was observed resulting in about 90% yield of a mixture of ketones.

EXAMPLE 6

The keto-alcohol furoin was dehydrogenated to the diketo compound furil using 5% by volume (as measured on the dry catalyst powder) of the catalyst used in the preceding examples. The product was entrained in and separated at about 200° C. from a refluxing solution in a high molecular weight hydrocarbon such as pentamethylheptane obtained by hydrogenating trimerised isobutene. It was obtained in a yield of 70% by weight.

I claim:

1. A process for the continuous liquid phase dehydrogenation of primary alcohols to produce the corresponding aldehydes in high purity and in a yield in excess of about 60% by weight of the alcohol employed without the simultaneous production of large quantities of other products which comprises continuously treating said alcohol in the liquid phase in a reaction zone at a temperature within the range of from about 150° to about 250° C. and at a pressure so adjusted relative to the boiling point of said alcohol as to insure operation in the liquid phase, in the presence of a solid dehydrogenation catalyst, continuously removing the product of this treatment as it is formed from said reaction zone as a vapor in an atmosphere of hydrogen immediately fractionally distilling said vapor in a fractional distillation zone to recover said aldehyde as overhead product and refluxing to the reaction zone the material which has left said zone as a vapor with said aldehyde.

2. A process as recited in claim 1 in which said fractional distillation is operated to produce substantially pure aldehyde and to provide a low concentration of aldehyde in the reflux return to said reaction zone.

3. A process as recited in claim 1 in which hydrogen is removed at the bottom of the distillation zone by selective diffusion.

4. A process as recited in claim 1 in which the solid dehydrogenation catalyst is copper barium chromite.

References Cited in the file of this patent

UNITED STATES PATENTS

| | | |
|---|---|---|
| Re. 21,373 | Lazier | Feb. 27, 1940 |
| 1,124,347 | Snelling | Jan. 12, 1915 |
| 1,418,448 | Legg | June 6, 1922 |
| 1,587,661 | Lommen | June 8, 1926 |
| 2,083,877 | Steck et al. | June 15, 1937 |
| 2,218,457 | Winans | Oct. 15, 1940 |
| 2,470,859 | Pavlic | May 24, 1949 |

OTHER REFERENCES

Stevens: Jour. Am. Chem. Soc., vol. 57, (1935) pages 1112–1117.

Badin: Jour. Am Chem. Soc. vol. 65, October 1943, pages 1809–1813.